United States Patent
Xia et al.

(10) Patent No.: US 10,516,575 B2
(45) Date of Patent: Dec. 24, 2019

(54) METHOD AND SYSTEM FOR EFFICIENTLY PROCESSING COMMAND LINE INTERFACE (CLI) INSTRUCTIONS ON A NETWORK ELEMENT

(71) Applicant: Arista Networks, Inc., Santa Clara, CA (US)

(72) Inventors: Zeqing Xia, Palo Alto, CA (US); Peter Rufer, Palo Alto, CA (US); Akshay Gattani, Sunnyvale, CA (US); Sharad Birmiwal, Surrey (CA)

(73) Assignee: Arista Networks, Inc., Santa Clara, CA (US)

( * ) Notice: Subject to any disclaimer, the term of this patent is extended or adjusted under 35 U.S.C. 154(b) by 170 days.

(21) Appl. No.: 15/679,796

(22) Filed: Aug. 17, 2017

(65) Prior Publication Data

US 2019/0058634 A1    Feb. 21, 2019

(51) Int. Cl.
*H04L 12/24* (2006.01)
*H04L 12/26* (2006.01)

(52) U.S. Cl.
CPC ........ *H04L 41/0879* (2013.01); *H04L 41/046* (2013.01); *H04L 41/0803* (2013.01); *H04L 41/04* (2013.01); *H04L 41/22* (2013.01); *H04L 43/08* (2013.01)

(58) Field of Classification Search
None
See application file for complete search history.

(56) References Cited

U.S. PATENT DOCUMENTS

| 8,752,183 | B1 * | 6/2014 | Heiderich | G06F 21/577 726/22 |
| 2005/0027841 | A1 * | 2/2005 | Rolfe | H04L 41/0226 709/223 |

* cited by examiner

*Primary Examiner* — Scott B Christensen
(74) *Attorney, Agent, or Firm* — Chamberlain, Hrdlicka, White, Williams & Aughtry (57) ABSTRACT

A method and system for efficiently processing command line interface (CLI) instructions on a network element. Specifically, the disclosed method and system analyze CLI statements to determine whether a given CLI statement should be processed by a command specific sub-agent or a non-specific sub-agent. The presence of a bypass statement included in the CLI statement may indicate that the CLI statement should be processed by a command specific sub-agent to reduce the computational load of executing the command specified by the CLI statement. The presence of a regular statement, rather than a bypass statement, in the CLI statement may indicate that the CLI statement should be processed by a nonspecific sub-agent. Processing of a CLI statement that includes a bypass statement may be expedited by bypassing generic runtime processes performed by a nonspecific sub-agent.

20 Claims, 6 Drawing Sheets

METHOD AND SYSTEM FOR EFFICIENTLY PROCESSING COMMAND LINE INTERFACE (CLI) INSTRUCTIONS ON A NETWORK ELEMENT

BACKGROUND

A network element may be configured before it is used. A network element may be configured using commands entered by a user.

SUMMARY

In general, in one aspect, the disclosure relates to a method for processing instructions on a network element. The method includes receiving, by the network element, first command line interface (CLI) instructions including a first CLI statement, making a first determination that the first CLI statement is a bypass statement, and processing, based on the first determination, the first CLI statement using a first command specific sub-agent, wherein processing by a set of nonspecific sub-agents is bypassed.

In general, in one aspect, the disclosure relates to a system. The system includes a network element. Further, the network element includes a command line interface (CLI) agent. The CLI agent is programmed to receive CLI instructions that include a CLI statement, make a determination that the CLI statement is a bypass statement, and process, based on the determination, the CLI statement using a command specific sub-agent, wherein processing by a set of nonspecific sub-agents is bypassed.

in general, in one aspect, the disclosure relates to a non-transitory computer readable medium (CRM). The non-transitory CRM includes computer readable program code, which when executed by a computer processor, enables the computer processor to receive, at a network element, first command line interface (CLI) instructions comprising a first CLI statement, make a first determination that the first CLI statement is a bypass statement, and process, based on the first determination, the first CLI statement using a first command specific sub-agent, wherein processing by a set of nonspecific sub-agents is bypassed.

Other aspects of the disclosure will be apparent from the following description and the appended claims.

DETAILED DESCRIPTION

Specific embodiments of the disclosure will now be described in detail with reference to the accompanying figures. In the following detailed description of the embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In the following description of FIGS. 1-4, any component described with regard to a figure, in various embodiments of the disclosure, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment which may be implemented in addition to, in conjunction with, or in place of the embodiments described with regard to a corresponding like-named component in any other figure.

Throughout the application, ordinal numbers first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure relate to a method and system for efficiently processing command line interface (CLI) instructions on a network element. Specifically, one or more embodiments of the disclosure analyze CLI statements to determine whether a given CLI statement should be processed by a command specific sub-agent or a non-specific sub-agent. The presence of a bypass statement included in the CLI statement may indicate that the CLI statement should be processed by a command specific sub-agent to reduce the computational load of executing the command specified by the CLI statement. The presence of a regular statement, rather than a bypass statement, in the CLI statement may indicate that the CLI statement should be processed by a nonspecific sub-agent. Processing of a CLI statement that includes a bypass statement may be expedited by bypassing generic runtime processes performed by a nonspecific sub-agent.

Figure 1:
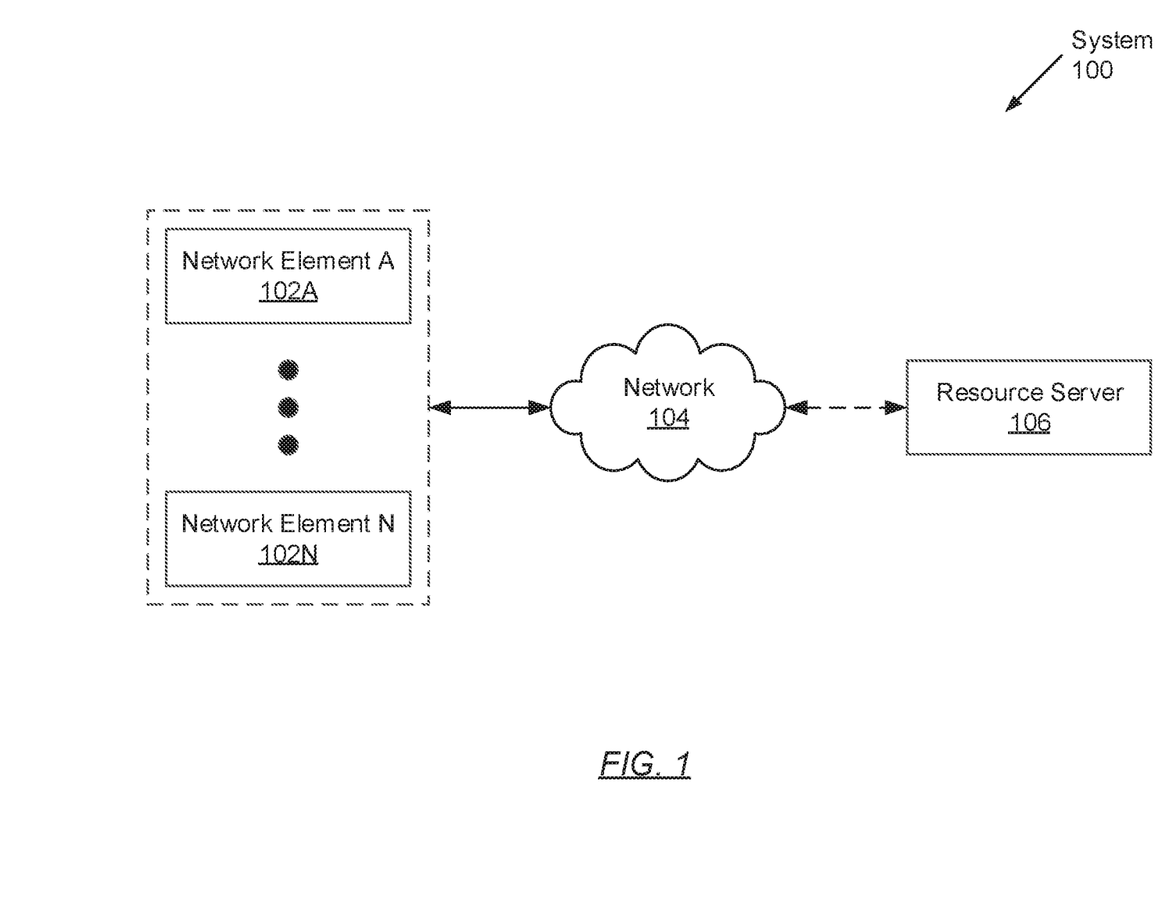
FIG. 1 shows a system in accordance with one or more embodiments of the disclosure.

FIG. 1 shows a system in accordance with one or more embodiments of the disclosure. In one embodiment of the disclosure, the system (100) includes one or more network element(s) (102A, 102N) and a network (104). In another embodiment of the disclosure, the system (100) further includes a resource server (106) operatively connected to the network element(s) (102A, 102N) through the network (104). Each of these components is described below.

In one embodiment of the disclosure, a network element (102A, 102N) may be a physical device that includes persistent storage, memory (e.g., random access memory (RAM), flash memory, shared memory), one or more computer processor(s) (e.g., integrated circuits) (including a switch chip or network processor), and at least one physical network interfaces or ports. The switch chip or network processor may be hardware that determines out of which egress network interface or port on the network element (102A, 102N) to forward media access control (MAC) frames. The switch chip or network processor may include egress and ingress network interfaces or ports that may connect to the physical network interfaces or ports on the network element (102A, 102N). Further, each physical network interface or port may or may not be connected, directly or indirectly, to another component (e.g., another network element (102A, 102N) or the resource server (106)) in the system (100). A network element (102A, 102N) may be configured to receive network packets via the network interfaces or ports, and determine whether to: (i) drop the network packet; (ii) process the network packet in accordance with one or more embodiments of the disclosure; and/or (iii) send the network packet, based on the processing, out another network interface or port on the network element (102A, 102N).

How the network element (102A, 102N) makes the determination of whether to drop a network packet, and/or send a network packet to another component in the system (100) depends, in part, on whether the network element (102A, 102N) is a layer-2 (L2) switch or a layer-3 (L3) switch (also referred to as a multilayer switch), which may perform at least some functions of a router. If the network element (102A, 102N) is operating as a L2 switch, the network element (102A, 102N) uses the destination MAC address along with a forwarding table or policy to determine out of which network interface or port to send the network packet. If the network element (102A, 102N) is operating as a L3 switch, the network element (102A, 102N) uses the destination Internet Protocol (IP) address along with a routing table or policy to determine out of which network interface or port to send the network packet, and includes the ability to write the MAC address of the next hop (or component in the system (100)) to receive the network packet in place of its own MAC address (which the last hop or component in the system (100) to send the network packet wrote) in the L2 header information encapsulating the network packet. If the network element (102A, 102N) is a multilayer switch, the network element (102A, 102N) includes functionality to process network packets using both MAC address and IP addresses.

In one embodiment of the disclosure, the persistent storage on a network element (102A, 102N) may include any type of non-transitory computer readable medium that includes software instructions in the form of computer readable program code, which may be stored in whole or in part, and permanently or temporarily. Examples of the non-transitory computer readable medium include, but are not limited to, a CD, DVD, storage device, a diskette, a tape, flash memory, or physical memory. Further, when executed by the one or more computer processor(s), the software instructions enable the network element (102A, 102N) to perform one or more embodiments of the disclosure described below (see e.g., FIGS. 3A-3C). Examples of a network element (102A, 102N) include, but are not limited to, a switch, a router, and a multilayer switch. Network elements (102A, 102N) are described in further detail below with respect to FIG. 2.

In one embodiment of the disclosure, the network (104) may be a set of interconnected network elements (102A, 102N) or systems, which operatively connect the network element(s) (102A, 102N) to one another and the resource server (106). The network (104) includes functionally to facilitate communications between at least these aforementioned components. Further, the network (104) may include any combination of local area network (LAN) and/or wide area network (WAN) segments, such as the Internet, which may employ any combination of existing and/or future developed wired and/or wireless connections and communication protocols.

In one embodiment of the disclosure, a resource server (106) may be any type of system (e.g., software and computer hardware) that is configured to generate, send, receive, and/or process requests and replies either locally or over the network (104) using software and computer hardware. The resource server (106) may include one or more processor(s), memory, and one or more physical network interface(s). Further, the resource server (106) may include functionality to generate, receive, and/or transmit MAC frames. Specifically, the resource server (106) may include further functionality to: (i) receive a resource request specified by a uniform resource locator (URL) from a requesting network element (102A, 102N); (ii) identify a stored network element specific resource using at least the URL and a unique identifier (e.g., an IP address, a MAC address, etc.) associated with the requesting network element (102A, 102N); and (iii) transmit a resource response, including the identified network element specific resource, back to the requesting network element (102A, 102N). In one embodiment of the disclosure, different network elements (102A, 102N) may submit different resource requests that include a same URL to the resource server (106). In such an embodiment, the resource server (106) includes functionality to, despite receiving the same URL, identify and transmit different resources to the different network elements (102A, 102N). In this sense, a network element specific resource refers to a resource specific or unique to a given network element (102A, 102N), which may be identified by a given URL and an identifier unique to the given network element (102A, 102N). Examples of the resource server (106) include, but are not limited to, a host (e.g., a database host, a dynamic host configuration protocol (DHCP) host, an application host, a file host, a print host, a mail host, or any other host), a desktop computer, a mobile device (e.g., a laptop computer, a smart phone, a personal digital assistant, a tablet computer, or any other mobile device), a cloud-based platform, or any other type of computing device with the aforementioned minimum requirements.

While FIG. 1 shows a configuration of components, other system configurations may be used without departing from the scope of the disclosure.

Figure 2:
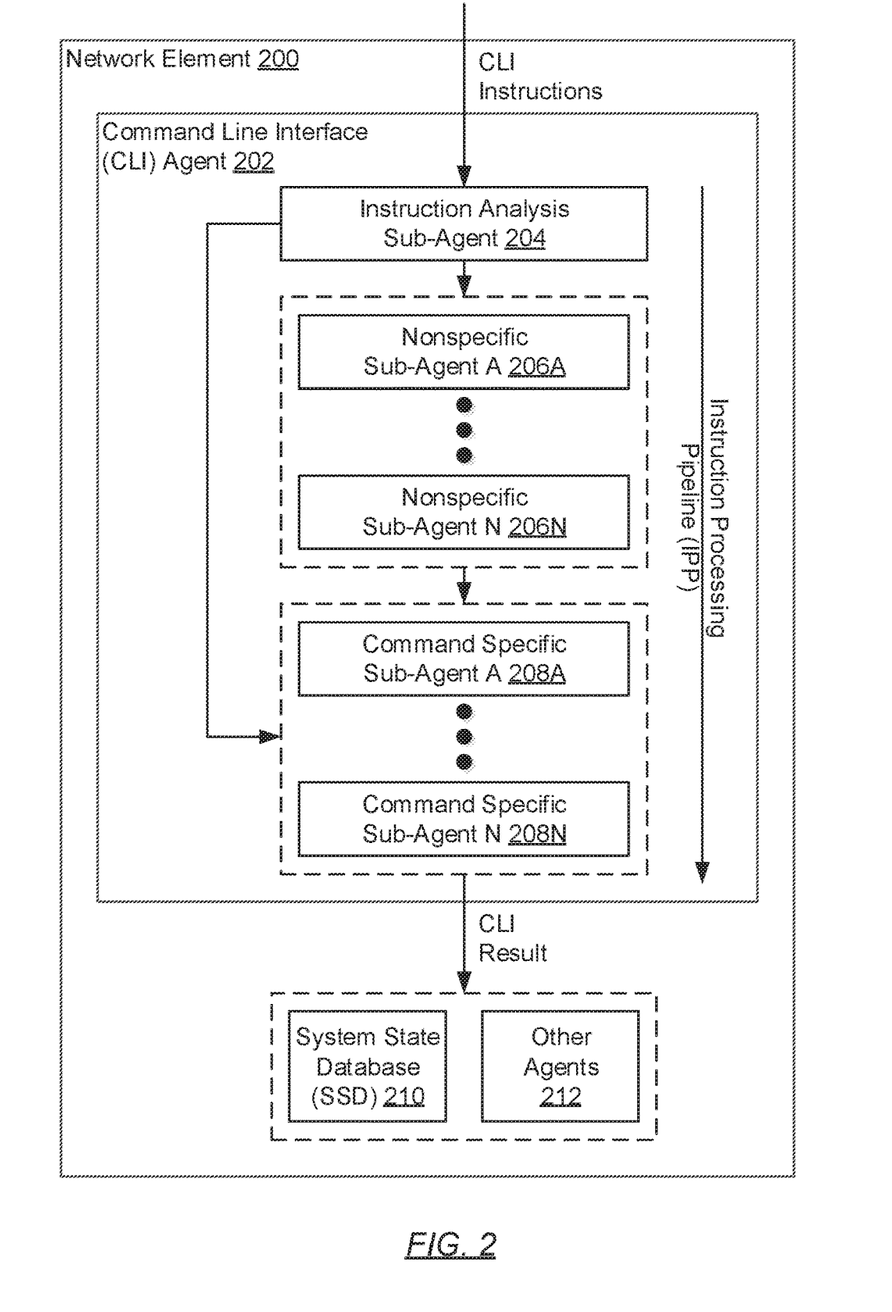
FIG. 2 shows a network element in accordance with one or more embodiments of the disclosure.

FIG. 2 shows a network element in accordance with one or more embodiments of the disclosure. The network element (200) includes numerous agents, one of which is CLI agent (202). In one embodiment of the disclosure, an agent may be a process (or an instance of a computer program executing on the network element (200)) that performs a specific role. With this in mind, the CLI agent (202) may be a process dedicated to performing responsibilities on the network element (200) associated with the CLI, wherein the CLI may be a text-based user interface employed by users to interact with the network element (200). Subsequently, in one embodiment of the disclosure, the CLI agent (202) may be a command line interpreter and, therefore, may include functionality to read and execute CLI instructions. Towards implementing the aforementioned functionality, the CLI agent (202) includes an instruction analysis sub-agent (204), a set of nonspecific sub-agents (206A, 206N), and a set of command specific sub-agents (208A, 208N), which collectively form an instruction processing pipeline (IPP). Each of these components is described below.

In one embodiment of the disclosure, a sub-agent may be a portion (or sub-process) of a larger process (i.e., an agent) that may be executing on the network element (200). Subsequently, a sub-agent may be configured to perform a designated portion of the operations for which the larger process may be responsible. To that end, in one embodiment of the disclosure, the instruction analysis sub-agent (204) may be a sub-process of the CLI agent (202). Further, the instruction analysis sub-agent (204) may include functionality to: (i) receive CLI instructions, which may include one or more CLI statement(s); (ii) analyze the CLI statement(s) to determine whether a given CLI statement is a bypass statement or a regular statement; and (iii) direct a given CLI statement through one or both sets of subsequent sub-agents in the IPP based on the results of the analysis performed in (ii).

In one embodiment of the disclosure, the instruction analysis sub-agent (204) may receive CLI instructions that may be entered by a user via the CLI of the network element (200). In another embodiment of the disclosure, the instruction analysis sub-agent (204) may receive CLI instructions through the reading of a data file or script. In yet another embodiment of the disclosure, the instruction analysis sub-agent (204) may receive CLI instructions by way of a data stream (i.e., representative of a sequence of data packets). Further, as mentioned above, in one embodiment of the disclosure, CLI instructions may include one or more CLI statement(s). In one embodiment of the disclosure, a CLI statement may be a string of characters (e.g., alphanumeric text, symbols, etc.) that may specify a command and zero or more arguments or parameters particular to the command. Further, one of ordinary skill in the art would appreciate that a CLI statement may specify additional or alternative elements (e.g., one or more options/flags, conditional statements, logical operators, loops, etc.) without departing from the scope of the disclosure.

In one embodiment of the disclosure, the instruction analysis sub-agent (204) may analyze a given CLI statement to determine the statement type with which the given CLI statement identifies. As a result of the analysis, in one embodiment of the disclosure, a given CLI statement may be identified as a bypass statement, whereas in another embodiment of the disclosure, a given CLI statement may be alternatively identified as a regular statement. Moreover, in one embodiment of the disclosure, analyses of a given CLI statement may entail command matching, whereby the command specified in the given CLI statement is compared against a table or list of command-to-statement type mappings. In such an embodiment, each command-to-statement type mapping may specify: a particular command and a statement type (i.e., the bypass statement type or the regular statement type) to which the particular command is associated. In another embodiment of the disclosure, analyses of a given CLI statement may additionally or alternatively entail subjecting the given CLI statement to parsing and pattern matching to determine the presence or absence of a URL within the given CLI statement. In an embodiment whereby a URL is present, the URL may be an argument of the command specified in the CLI statement. Further, in one embodiment of the disclosure whereby a URL is determined to be present in the given CLI statement, the given CLI statement may be identified as a bypass statement. Conversely, in another embodiment of the disclosure whereby a URL is determined to be absent in the given CLI statement, the given CLI statement may be identified as a regular statement.

The following expressions include examples of a given CLI statement. These expressions are for explanatory: purposes only and not intended to limit the scope of the disclosure. With respect to the example expressions below, the command "ip as-path access-list" is used. For reference, the "ip as-path access-list" command, when executed, may create an autonomous system (AS) numbers path access list to filter Border Gateway Protocol (BGP) route updates.

Expression 1—Regular CLI Statement

Notation: ip as-path access-list [list-name] [filter-type] regex [origin]

Parameters: [list-name]—the name of the AS path access list
  [filter-type]—the access resolution of the specified AS path
  Options: permit—access is permitted
    deny—access is denied
  regex—a regular expression for the AS path being filtered
  [origin]—the origin of the path information
    Options: <no option>—sets the origin to any (below)
      any—any BGP origin
      egp—exterior gateway protocol origin
      igp—interior gateway protocol origin In one embodiment of the disclosure, and by way of an example, in order to create an AS path access list named "FOO" that allows only those routes that include paths from or through AS 1, AS 2, and AS 3 from any BGP origin, the following set of regular statements is necessary:
  ip as-path access-list FOO permit 1 any
  ip as-path access-list FOO permit 2 any
  ip as-path access-list FOO permit 3 any Expression 2—Bypass CLI Statement Notation: ip as-path access-list [list-name] [filter-type] source [url]

Parameters: [list-name]—the name of the AS path access list
  [filter-type]—the access resolution of the specified AS path
  Options: <no option>—access is specified within each entry specified in [url]
    permit—access is permitted for all entries specified in [url]
    deny—access is denied for all entries specified in [url]
  source—a precursor for a resource URL
  [url]—the URL for a network element specific resource In one embodiment of the disclosure, and by way of other examples, in order to create the AS path access list implemented by the set of regular statements above using a bypass statement, there may be two approaches:

(1) ip as-path access-list FOO source http://domainname/resource1
  where "resource1" includes the following entries:
    permit 1 any
    permit 2 any
    permit 3 any
      OR
(2) ip as-path access-list FOO permit source http://domainname/resource2
  where "resource2" includes the following entries:
    3 any
    1 any
    2 any In one embodiment of the disclosure, with respect to approach (1) above, the URL for the network element specific resource (i.e., http://domainname/resource1) specified in the first bypass statement may internalize the [filter-type], regex, and [origin] parameters specified within each of the above-listed regular statements of Expression 1. This allows the set of multiple regular statements of Expression 1 to be condensed into a single bypass statement. Further, without the specification of a [filter-type] within the first bypass statement, each entry in the corresponding network element specific resource specifies a desired access resolution for their respective AS.

In another embodiment of the disclosure, with respect to approach (2) above, the URL for the network element specific resource (i.e., http://domainname/resource2) specified in the second bypass statement may remove the repeating of the [filter-type] for each entry (i.e., granted that all entries specify the same access resolution). The specification of the [filter-type] within the bypass statement itself, and not within each entry in the network element specific resource, may alternatively coerce or override each entry to retain the access resolution specified by the [filter-type] parameter. Furthermore, with the specification of the [filter-type] within the bypass statement itself, the original sequencing of each entry may be ignored, thereby permitting the arrangement of the entries in an optimal order e.g., by placing entries that would match more AS paths first) to maximize performance.

Proceeding with the discussion of FIG. 2, in one embodiment of the disclosure, after analyzing a given CLI statement, the instruction analysis sub-agent (204) may direct the given CLI statement through one or both sets of subsequent sub-agents in the IPP. As such, in one embodiment of the disclosure, based on determining that the given CLI statement is a bypass statement, the given CLI statement may be directed through the set of command specific sub-agents (208A, 208N), thereby bypassing the set of nonspecific sub-agents (206A, 206N), in the IPP for processing. In one embodiment of the disclosure, the convention established for the IPP includes subjecting a given CLI statement through a sequential processing order, which includes: (a) initial processing by the instruction analysis sub-agent (204); (b) secondary processing by one or more of the set of nonspecific sub-agents (206A, 206N); and (c) tertiary processing by one or more of the set of command specific sub-agents (208A, 208N). Accordingly, in bypassing the set of nonspecific sub-agents (206A, 206N), the given CLI statement (which has been identified as a bypass statement) may proceed expeditiously through the IPP. In one embodiment of the disclosure, in being identified as a bypass statement, the given CLI statement may specifically be provided to one or more command specific sub-agents (208A, 208N) associated with the command specified in the given CLI statement. Associations relating commands to command specific sub-agents (208A, 208N) may be stored in a system state database (SSD) (210) (described below) instantiated on the network element (200). On the other hand, and in another embodiment of the disclosure, based on determining that the given CLI statement is a regular statement, the given CLI statement continues through the entirety of the IPP for processing. That is, the given CLI statement (which has been identified as a regular statement) may be directed through the set of nonspecific sub-agents (206A, 206N) and, subsequently, through the set of command specific sub-agents (208A, 208N), which thus prolongs execution of the CLI statement substantially.

In one embodiment of the disclosure, each nonspecific sub-agent (206A, 206N) may be another sub-process of the CLI agent (204). Particularly, a nonspecific sub-agent (206A, 206N) may implement one or more runtime subroutine(s) built into the CLI for the network element (200). These runtime subroutines may be low-level routines used to invoke behaviors of the runtime environment associated with the CLI. By way of an example, one nonspecific sub-agent (206A, 206N) may be responsible for subroutines that provide usage/user help for the CLI of the network element (200). By way of another example, another nonspecific sub-agent (206A, 206N) may implement the exception handling subroutines for catching and managing runtime errors. By way of yet another example, another nonspecific sub-agent (206A, 206N) may be responsible for runtime memory management.

In one embodiment of the disclosure, each command specific sub-agent (208A, 208N) may be yet another sub-process of the CLI agent (204). Particularly, a command specific sub-agent (208A, 208N) may implement one or more CLI associated command(s). These commands may be directives to the network element (200) to perform specific tasks. In one embodiment of the disclosure, these commands may set and/or change any aspect or state pertaining to the network element (200) including, but not limited to, configuration state, operational state, etc. By way of an example, a command specific sub-agent (208A, 208N) may implement the BGP, and thus be associated with a BGP-related command, for the network element (200).

In one embodiment of the disclosure, the network element (200) may further include a SSD (210). The SSD (210) may be a data repository for storing and tracking any and all hardware, software, and firmware state associated with the network element (200). Furthermore, the state stored in the SSD (210) may be current and/or historical state. As a data repository, the SSD (210) may take the form of any type of non-transitory storage unit and/or device. The data repository may comprise data structures for indexing data stored in the data repository such as, for example, a file system, a database, a collection of tables, or any other storage medium or structures. Moreover, the SSD (210) may include multiple different non-transitory storage units and/or devices. In one embodiment of the disclosure, results obtained through the processing of CLI statements may be stored in the SSD (210).

In one embodiment of the disclosure, the network element (200) may further include other agents (212). These other agents (212) may be additional processes executing on the network element (200), which may be responsible for implementing one or more functionalities, features, protocols, etc. of the network element (200). Examples of other agents (212) include, but are not limited to, a light emitting diode (LED) agent responsible for LED operations on the network element (200), a SNMP agent responsible for implementing the simple network management protocol (SNMP) on the network element (200), etc.

Figure 3A:
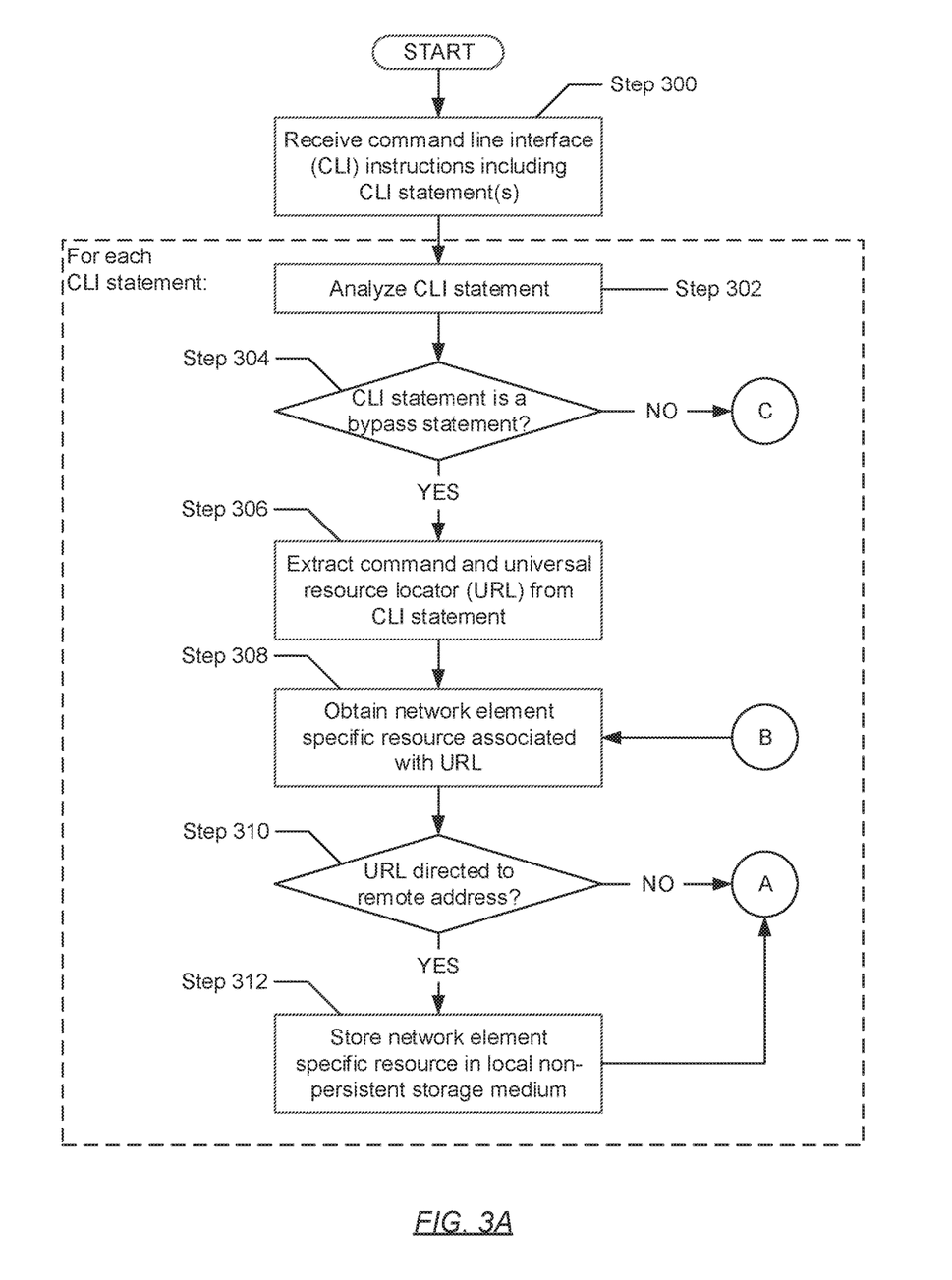
FIGS. 3A-3C show flowcharts describing a method for processing CLI instructions on a network element in accordance with one or more embodiments of the disclosure.
Figure 3B:
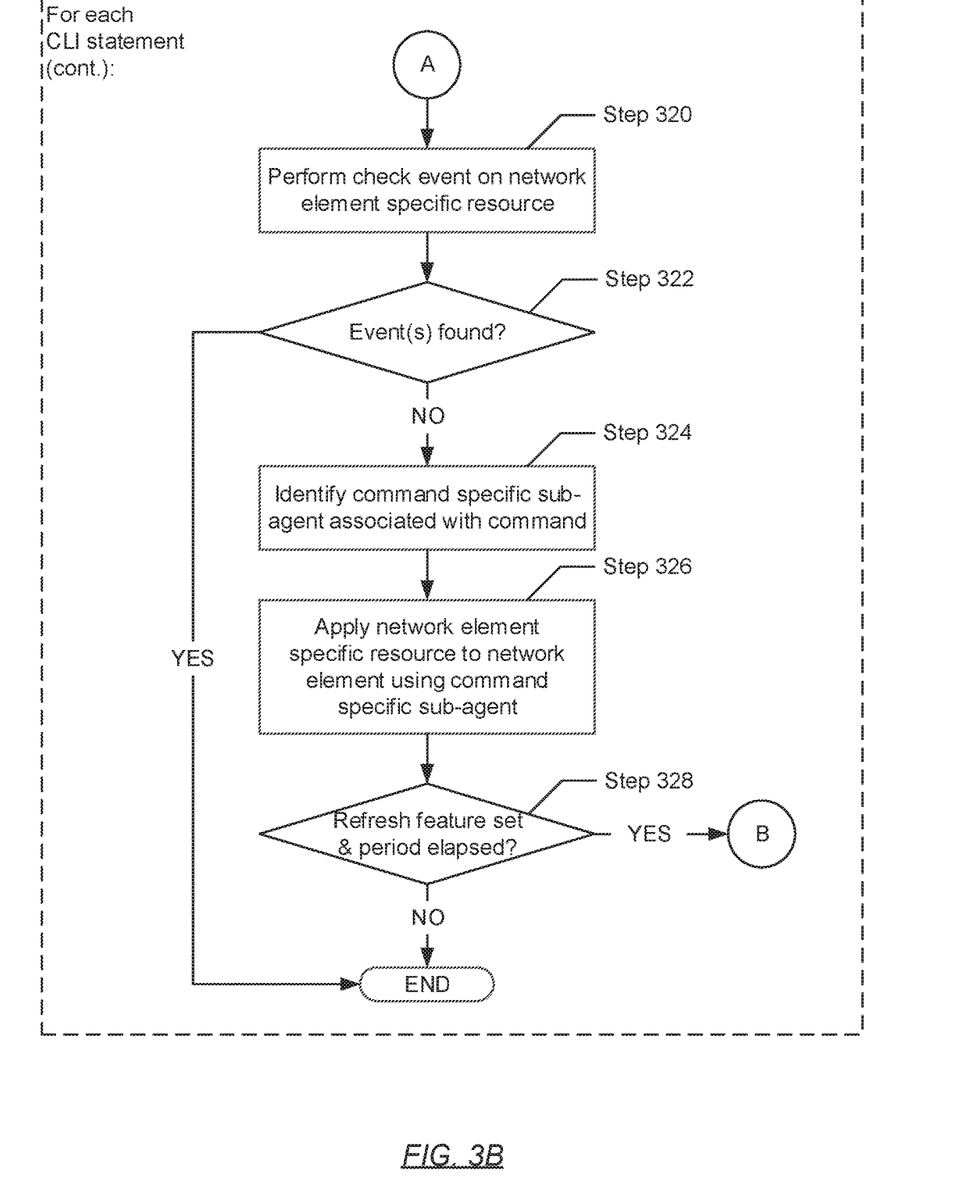
Figure 3C:
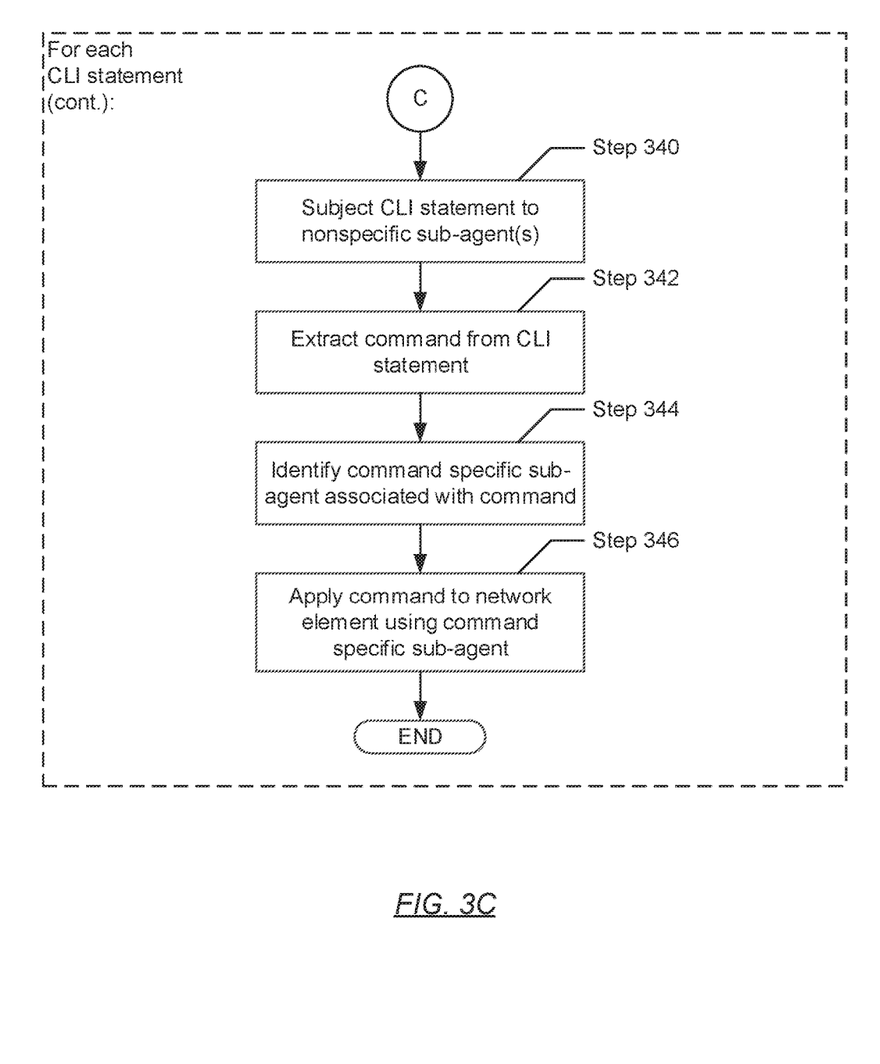

While FIG. 2 shows a configuration of components, other network element configurations may be used without departing from the scope of the disclosure FIGS. 3A-3C show flowcharts describing a method for processing CLI instructions on a network element in accordance with one or more embodiments of the disclosure. While the various steps in the flowcharts are presented and described sequentially, one of ordinary skill in the art will appreciate that some or all of the steps may be executed in different orders, may be combined or omitted, and some or all steps may be executed in parallel.

Turning to FIG. 3A, in Step 300, CLI instructions are received. In one embodiment of the disclosure, the CLI instructions may include one or more CLI statements, each specifying at least a command in another embodiment of the disclosure, each CLI statement may further specify one or more argument(s) particular to the command. From here, the steps to follow are possibilities that pertain to each CLI statement of the one or more CLI statements included in the CLI instructions.

In Step 302, the given CLI statement is analyzed. As described above, in one embodiment of the disclosure, analyses performed on the given CLI statement may entail command matching to determine with which statement type (i.e., a bypass statement type or a regular statement type) the given CLI statement is associated. In another embodiment of the disclosure, analyses performed on the given CLI statement may entail parsing and pattern matching to determine the presence or absence of a URL, whereby the presence of a URL may identify the given CLI statement as a bypass statement, and alternatively, the absence of a URL may identify the given CLI statement as a regular statement.

In Step 304, a first determination (based on the analyses performed in Step 302) is made as to whether the given CLI statement is a bypass statement or a regular statement. If it is determined that the given CLI statement is a bypass statement, then the process proceeds to Step 306. On the other hand, if it is determined that the given CLI statement is a regular statement, then the process proceeds to Step 340 (see e.g., FIG. 3C).

In Step 306, after determining (in Step 304) that the given CLI statement is a bypass statement, the command and URL specified in the given CLI statement are extracted. In one embodiment of the disclosure, the URL may be an argument or parameter particular to the command. Further, in one embodiment of the disclosure, the URL may be directed to a local memory address on the network element. In another embodiment of the disclosure, the URL may be directed to an IP address associated with a remote resource server.

In Step 308, a network element specific resource is obtained. In one embodiment of the disclosure, the network element specific resource may be associated with the URL (extracted in Step 306). In addition, in one embodiment of the disclosure, the network element specific resource may be obtained at a local memory address on the network element specified by the URL. In another embodiment of the disclosure, the URL specifies a remote IP address, and thus, a resource request may be generated and submitted to a remotely located resource server whereon the resource resides. Following the transmitting of the resource request (which may include at least the URL and an identifier unique to the network element, such as a source IP and/or MAC address), a resource response may be received from the resource server that may include the network element specific resource. Also, as mentioned above, though multiple different entities may submit a resource request including the same URL, the different entities may receive different network element specific resources, from the resource server, based at least on their different unique identifiers. Further, examples of a network element specific resource include, but are not limited to, an IP address and/or MAC address associated with a network gateway, a default gateway, or a gateway of last resort (i.e., a network element that may provide access to another network that may implement different protocols), a list of network prefixes to control network peering and route information permissions, a list of attributes (e.g., BGP as-path information, community information, etc.) associated with certain network prefixes, a list of network prefixes for routes that are to be statically configured, a list of networks and/or destinations originated using routing protocols (e.g., BGP, Interior Gateway Protocol (IGP), etc.), and a list of IP routing policy constructs (e.g., as-path information, IP access information, etc.).

In Step 310, a second determination is made as to whether the URL (extracted in Step 306) is directed to a remote address. In one embodiment of the disclosure, the second determination may entail identifying whether the hostname and/or domain name specified in the URL refers to the network element itself or a remote machine. If it is determined that the URL is directed to a remote address (i.e., associated with a resource server), then the process proceeds to Step 312. On the other hand, if it is determined that the URL is directed to a local address (i.e., on the network element), then the process proceeds to Step 320 (see e.g., FIG. 3B).

In Step 312, after determining (in Step 310) that the URL is directed to a remote address, the network element specific resource (obtained in Step 308) is stored locally on the network element. In one embodiment of the disclosure, the network element specific resource may be stored in a non-persistent storage medium such as, for example, RAM, flash memory, or cache memory. In another embodiment of the disclosure, the network element specific resource may be stored in a persistent storage medium such as, for example, a hard disk drive, a solid-state drive, shared memory, etc. From here, the process proceeds to Step 320 (see e.g., FIG. 3B).

Turning to FIG. 3B, in Step 320, after determining (in Step 310) that the URL is directed to a local address or after storing the network element specific resource locally, a check event is performed on the network element specific resource. In one embodiment of the disclosure, the check event may entail scanning the network element specific resource for events, which may include, but are not limited to, syntactic errors, malicious programs, corrupted data, duplicate information, and other defects.

In Step 322, a third determination is made as to whether any events were found as a result of the check event (performed in Step 320). If it is determined that at least one event has been identified, the process ends (i.e., the processing of the given CLI statement and/or CLI instructions in its entirety may be aborted). On the other hand, if it is determined that not one event has been identified, the process proceeds to Step 324.

In Step 324, after determining (in Step 322) that not one event has been identified as a result of performing the check event on the network element specific resource, one or more command specific sub-agent(s) is/are identified. In one embodiment of the disclosure, as described above, a command specific sub-agent may be a sub-process executing on the network element, which may be responsible for implementing one or more command(s) that direct the network element to perform one or more specific task(s). Identification of a command specific sub-agent may entail using the command specified in the given CLI statement to perform a lookup of an association table, wherein the association table may contain entries relating commands to command specific sub-agents.

In Step 326, the network element specific resource is applied to the network element. In one embodiment of the disclosure, the network element specific resource may be applied by way of processing by the command specific sub-agent (identified in Step 324). In one embodiment of the disclosure, the application of the network element specific resource may effect changes in the configuration of the network element. In another embodiment of the disclosure, the application of the network element specific resource may effect changes in the operation of the network element. In yet another embodiment of the disclosure, the application of the network element specific resource may set and/or update any state pertaining to any functionalities, features, protocols, etc. of the network element.

In Step 328, a fourth determination is made as to whether a refresh feature is set and as to whether a refresh period has elapsed. In one embodiment of the disclosure, the refresh feature (when enabled by a user of the network element)

may automate the periodic retrieval of an updated network element specific resource associated with the URL. Further, in one embodiment of the disclosure, the periodicity of the retrieval may be set by the refresh period. The refresh period may be represented by any time interval. Subsequently, if it is determined that the refresh feature has been enabled and the refresh period has elapsed, the process repeats the above-described steps starting at Step 308 (see e.g., FIG. 3A). On the other hand, if it is determined that the refresh feature is disabled, the process ends (at least for the given CLI statement, thereby triggering the cycling of the above-mentioned steps for the next CLI statement of the CLI instructions).

Turning to FIG. 3C, in Step 340, after determining (in Step 304; see e.g., FIG. 3A) that the given CLI statement is a regular statement, rather than a bypass statement, the given CLI statement is directed through one or more nonspecific sub-agent(s). In one embodiment of the disclosure, as described above, each nonspecific sub-agent may be a sub-process executing on the network element that may implement a CLI runtime subroutine. These subroutines execute normally (i.e., during processing of a regular CLI statement), however, in one embodiment of the disclosure, may be circumvented during processing of a bypass CLI statement.

In Step 342, after subjecting the given CLI command through the set of nonspecific sub-agents, the command specified in the given CLI statement is extracted. In one embodiment of the disclosure, arguments associated with the command (and also specified in the given CLI statement, if any) may also be extracted. In Step 344, one or more command specific sub-agent(s) is/are identified. In one embodiment of the disclosure, as described above, a command specific sub-agent may be a sub-process executing on the network element, which may be responsible for implementing one or more command(s) that direct the network element to perform one or more specific task(s). Identification of a command specific sub-agent may entail using the command specified in the given CLI statement to perform a lookup of an association table, wherein the association table may contain entries relating commands to command specific sub-agents.

In Step 346, the command (extracted in Step 342) is applied to the network element. Specifically, in one embodiment of the disclosure, the command may be implemented by way of the command specific sub-agent (identified in Step 344). Further, in one embodiment of the disclosure, the application of the command may affect any state pertaining to any functionalities, features, protocols, etc. of the network element. At this point, at least for the given CLI statement, the process ends.

Figure 4:
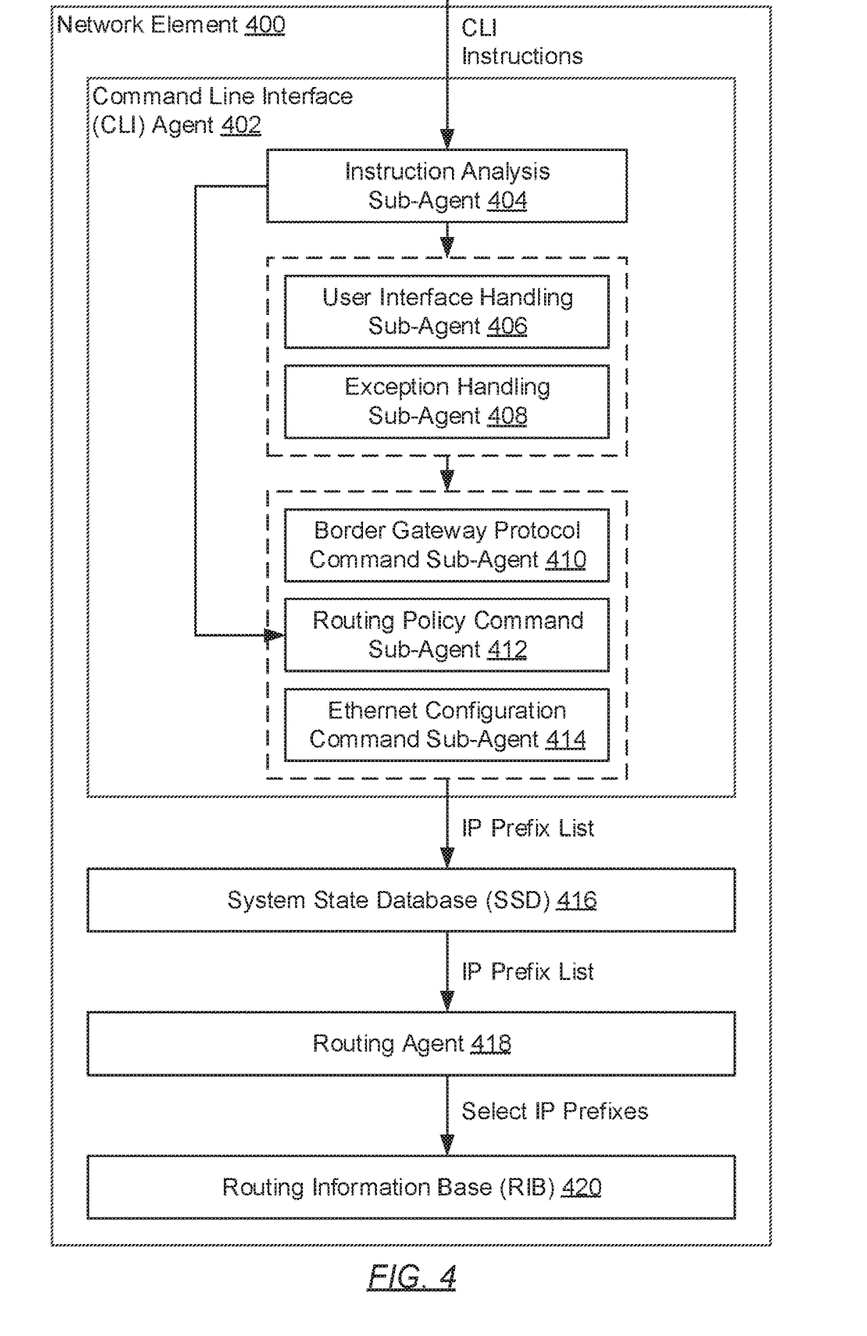
FIG. 4 shows an example network element in accordance with one or more embodiments of the disclosure.

FIG. 4 shows an example network element in accordance with one or more embodiments of the disclosure. The following example, presented in conjunction with components shown in FIG. 4, is for explanatory purposes only and not intended to limit the scope of the disclosure.

Turning to FIG. 4, the example network element (400) includes a number of agents (or processes) executing thereon, which include a CLI agent (402) and a routing agent (418). The CLI agent (402) is tasked with implementing the CLI for the network element (400), whereas the routing agent (418) is tasked with programming the routing information base (RIB) (420) on the network element (400). The network element (400) further includes a system state database (SSD) (416) accessible by the CLI agent (402) and the routing agent (418). With respect to the CLI agent (402), the CLI agent (402) includes the following sub-agents (or sub-processes): (i) an instruction analysis sub-agent (404) responsible for receiving CLI instructions and delegating the CLI statement(s) to one or both subsequent sets of sub-agents based on the determined statement type of a given CLI statement; (ii) a user interface handling sub-agent (406) (as a first nonspecific sub-agent) responsible for managing the usage/user helping subroutines for the CLI of the network element (400); (iii) an exception handling sub-agent (408) (as a second nonspecific sub-agent) responsible for detecting and handling runtime errors; (iv) a BGP command sub-agent (410) (as a first command specific sub-agent), which implements BGP on the network element (400); (v) a routing policy command sub-agent (412) (as a second command specific sub-agent), which enables the generation or importation of ordered sets of rules that define route redistribution access for a specified IP address space; and (vi) an Ethernet configuration command sub-agent (414) (as a third command specific sub-agent), which configures and monitors the various Ethernet network interfaces or ports on the network element (400).

Turning to the example, consider a scenario where the network administrator for the example network element (400) enters CLI instructions composed of a single CLI statement using the CLI for the network element (400). The CLI statement resembles the following notation:

rip prefix-list <name> source <URL> where the command is specified as "ip prefix-list", and is followed by associated arguments "<name>" and "<URL>", as well as option "source".

Following embodiments of the disclosure, the instruction analysis sub-agent (404) receives the CLI instructions, and particularly, analyzes the above-recited CLI statement. Through parsing and pattern matching, the instruction analysis sub-agent (404) eventually identifies the presence of a URL (i.e., argument "<URL>") within the CLI statement. Further, based on this indication, the instruction analysis sub-agent (404) determines that the CLI statement is a bypass statement. In response to the aforementioned determination, the instruction analysis sub-agent (404) subsequently submits a resource request including the specified URL and a MAC address belonging to the network element (400) to a remote resource server (not shown). A short time after the submission, the instruction analysis sub-agent (404) receives, from the resource server, a network element specific resource. Suppose the network element specific resource, per this example, is a file containing a multitude of prefix-list entries one per line, and in prefix-list configuration notation (example entries below)).

permit 1.0.0.0/28
permit 10.0.0.0/24
deny 20.0.0.0/24
. . .

Proceeding with the example, after obtaining the network element specific resource, the instruction analysis sub-agent (404) performs a check event on the network element specific resource. Suppose, as a result of performing the check event, no events (e.g., syntactical errors, duplicate entries, or any other defects) are identified. This may be the case because the network element specific resource may have been machine, rather than user, generated (i.e., by an application logic on the resource server, or alternatively, by an external controller that subsequently stored the network element specific resource in the resource server), and thus, would not have been susceptible to syntactic and/or semantic defects. Subsequently, the instruction analysis sub-agent (404) performs a lookup using the command specified in the CLI statement (i.e., "ip prefix-list") to associate the command with the routing policy command sub-agent (412). The instruction analysis sub-agent (404) then directs the CLI statement to routing policy command sub-agent (412) for further processing.

At this point, because the CLI statement is determined to be a bypass statement, execution of CLI runtime routines (i.e., implemented by the user interface handling sub-agent (406) and the exception handling sub-agent (408)) are skipped, thereby expediting processing of the CLI statement. Upon obtaining the CLI statement, the routing policy command sub-agent (412) subsequently applies the network element specific resource (i.e., the prefix-list entries) to the network element (400). Specifically, the routing policy command sub-agent (412) updates the routing configuration state of the network element (400) by storing the IP prefix-list entries in the SSD (416). From here, the routing agent (418), as a subscriber to changes in the routing configuration state, receives the IP prefix-list entries from the SSD (416). Afterwards, using information from one or more routing protocols (e.g., BGP, open shortest path first (OSPF), interior gateway routing protocol (IGRP), etc.), the routing agent (418) selects the best routes, associated with a portion of the prefix-list entries, to populate/program the RIB (420). Furthermore, though not depicted, the routing agent (418) may select another set of routes, associated with a portion of the prefix-list entries, to export to (or share with) peer network elements (not shown) employing one or more routing protocols also executing on the network element (400).

Embodiments of the disclosure provide a mechanism for efficiently processing CLI instructions on a network element. To that effect, one or more embodiments of the disclosure are advantageous over existing methods and/or systems at least because: (i) embodiments of the disclosure sidestep, for certain statements (i.e., bypass CLI statements), inherently slow runtime subroutines to expedite CLI statement execution and/or resource implementation; (ii) embodiments of the disclosure reduce the computational and/or storage requirements for processing a CLI statement that includes a bypass command by bypassing a general purpose runtime subroutine; (iii) embodiments of the disclosure enable forwarding information of a network element to be updated using a CLI command that invokes execution of a command specific sub-agent rather than a nonspecific sub-agent; (iv) embodiments of the disclosure reduce a cognitive burden on a user of a CLI by automatically detecting the presence of a bypass command based on the content of a CLI command entered by a user rather than requiring that the user to be aware of specific CLI commands to invoke command specific sub-agents rather than nonspecific sub-agents; (v) embodiments of the disclosure centralize large sets of information that can be efficiently managed and dispatched to network elements; (vi) the updating of information, by embodiments of the disclosure, is transparent to the network elements; (vii) embodiments of the disclosure decouple the provisioning of a resource from the processing of the resource (e.g., the resource may be updated locally on a network element or remotely on a resource server independent of when the resource is processed, whereby resource processing may be driven by timer events (i.e., refresh) or by a file-system (or kernel) notification); and (viii) embodiments of the disclosure simplify CLI startup configuration by collapsing verbose, multi-line configurations (potentially implementing a plethora of rules) into single-line CLI statements.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A method for processing instructions on a network element, comprising:
   receiving, by the network element, first command line interface (CLI) instructions comprising a first CLI statement;
   making a first determination that the first CLI statement is a bypass statement wherein the bypass statement, when present, identifies that a set of nonspecific sub-agents are to be bypassed that are not bypassed when processing a second CLI statement that is not a bypass statement; and
   processing, based on the first determination, the first CLI statement using a first command specific sub-agent, wherein processing by the set of nonspecific sub-agents is bypassed.

2. The method of claim 1, wherein making the first determination comprises:
   identifying a uniform resource locator (URL) specified in the first CLI statement.

3. The method of claim 2, wherein processing the first CLI statement using the first command specific sub-agent comprises:
   obtaining a network element specific resource associated with the URL and a command specified in the first CLI statement;
   performing a check event on the network element specific resource;
   making a second determination, based on the check event, that no events were identified;
   identifying, based on the second determination, the first command specific sub-agent, wherein the first command specific sub-agent is associated with the command; and
   applying the command using the first command specific sub-agent and the network element specific resource.

4. The method of claim 3, wherein applying the command using the first command specific sub-agent and the network element specific resource comprises:
   updating a system state database (SSD) using a plurality of Internet Protocol (IP) prefix list entries specified in the network element specific resource.

5. The method of claim 1, further comprising:
   receiving, by the network element, second CLI instructions comprising a third CLI statement;
   making a second determination that the third CLI statement is not a bypass statement; and
   processing, based on the second determination, the third CLI statement using a second command specific sub-agent after the second CLI statement is processed by the set of nonspecific sub-agents.

6. A system, comprising:
   a network element comprising:
      a command line interface (CLI) agent programmed to:
         receive CLI instructions comprising a CLI statement;
         make a determination that the CLI statement is a bypass statement, wherein the bypass statement, when present, identifies that a set of nonspecific sub-agents are to be bypassed that are not bypassed when processing a second CLI statement that is not a bypass statement; and process, based on the determination, the CLI statement using a command specific sub-agent, wherein processing by the set of nonspecific sub-agents is bypassed.

7. The system of claim 6, wherein the command specific sub-agent and the set of nonspecific sub-agents are sub-processes of the CLI agent.

8. The system of claim 6, wherein making the determination comprises:
identifying a uniform resource locator (URL) specified in the CLI statement.

9. The system of claim 8, wherein the URL specifies a local memory address on the network element.

10. The system of claim 8, wherein the URL specifies a remote Internet Protocol (IP) address.

11. The system of claim 10, further comprising:
a resource server associated with the remote IP address and operatively connected to the network element,
wherein processing the CLI statement comprises:
generating a resource request comprising the URL and a unique identifier associated with the network element;
transmitting the resource request to the resource server; and
obtaining, from the resource server, a resource response comprising a network element specific resource.

12. The system of claim 11, wherein the network element further comprises a system state database (SSD), wherein processing the CLI statement further comprises:
updating the SSD using a plurality of IP prefix list entries specified in the network element specific resource.

13. The system of claim 6, wherein the CLI statement comprises a command, wherein the command specific sub-agent is a sub-process programmed to implement the command.

14. The system of claim 6, wherein each nonspecific sub-agent of the set of nonspecific sub-agents is a CLI runtime subroutine.

15. The system of claim 6, wherein the network element is one selected from a group consisting of a switch, a router, and a multilayer switch.

16. A non-transitory computer readable medium (CRM) comprising computer readable program code, which when executed by a computer processor, enables the computer processor to:
receive, at a network element, first command line interface (CLI) instructions comprising a first CLI statement;
make a first determination that the first CLI statement is a bypass statement wherein the bypass statement, when present, identifies that a set of nonspecific sub-agents are to be bypassed that are not bypassed when processing a second CLI statement that is not a bypass statement; and
process, based on the first determination, the first CLI statement using a first command specific sub-agent, wherein processing by the set of nonspecific sub-agents is bypassed.

17. The non-transitory CRM of claim 16, wherein making the first determination comprises:
identifying a uniform resource locator (URL) specified in the first CLI statement.

18. The non-transitory CRM of claim 17, wherein processing the first CLI statement using the first command specific sub-agent comprises:
obtaining a network element specific resource associated with the URL and a command specified in the first CLI statement;
performing a check event on the network element specific resource;
making a second determination, based on the check event, that no events were identified;
identifying, based on the second determination, the first command specific sub-agent, wherein the first command specific sub-agent is associated with the command; and
applying the command using the first command specific sub-agent and the network element specific resource.

19. The non-transitory CRM of claim 18, wherein applying the command using the first command specific sub-agent comprises:
updating a system state database (SSD) using a plurality of Internet Protocol (IP) prefix list entries specified in the network element specific resource.

20. The non-transitory CRM of claim 16, further comprising:
receiving, by the network element, second CLI instructions comprising a third CLI statement;
making a second determination that the third CLI statement is not a bypass statement; and
processing, based on the second determination, the third CLI statement using a second command specific sub-agent after the second CLI statement is processed by the set of nonspecific sub-agents.

* * * * *